United States Patent [19]

Moody

[11] Patent Number: 5,084,286

[45] Date of Patent: Jan. 28, 1992

[54] METHOD OF PREPARING TENDERIZED MEAT

[76] Inventor: Henry C. Moody, 5049 Greenbriar, Corpus Christi, Tex. 78413

[21] Appl. No.: 725,913

[22] Filed: Jul. 3, 1991

Related U.S. Application Data

[63] Continuation of Ser. No. 518,977, May 4, 1990, abandoned.

[51] Int. Cl.⁵ .............................................. A23L 1/31
[52] U.S. Cl. .................................... 426/281; 426/323; 426/574
[58] Field of Search ................ 426/281, 323, 574, 641

[56] References Cited

U.S. PATENT DOCUMENTS

| Re. 30,023 | 6/1979 | Hawley et al. | 426/281 |
|---|---|---|---|
| 3,207,608 | 9/1965 | Brown et al. | 426/281 |
| 3,928,634 | 12/1975 | Gasbarro | 426/281 |

*Primary Examiner*—Donald E. Czaja
*Assistant Examiner*—Leslie Wood
*Attorney, Agent, or Firm*—Pravel, Gambrell, Hewitt, Kimball & Krieger

[57] ABSTRACT

A marinate composition and process for treating meats of all types that tenderizes the meat and provides the cooked meat with a weight gain relative to the raw, uncooked meat. The invention marinate composition includes isolated soya protein, sodium tripolyphosphate, water and, optionally, spices and condiments. The process includes tumbling or massaging the meat in the marinate composition.

3 Claims, No Drawings

METHOD OF PREPARING TENDERIZED MEAT

This is a continuation of co-pending application Ser. No. 07/518,077 filed on May 4, 1990 now abandoned.

BACKGROUND

1. Field of the Invention

The invention relates to meat products treated with marinating compositions to enhance tenderness and taste and to marinating compositions and methods.

2. Background of the Invention

In general, a carcass provides a proportion of higher priced meat cuts and a proportion of lower priced cuts. In order to maximize revenues, it is desirable to upgrade meat products from lower priced to higher priced products.

In the production of meat products, certain cuts of meat may be designated "high quality" and therefore high priced because of the tenderness and taste of these cuts. Other cuts may be designated "low quality" because they are tougher and therefore command a lower price. In order to maximize the proportion of high priced meat products obtainable from a carcass, lower quality meats may be subjected to processes that upgrade the meat. Further, even high quality cuts can be further upgraded by the addition of marinates, spices and the like to produce a product that requires a minimum of preparation before cooking.

Over the years, several methods have been developed for the treating of meats. Thus, U.S. Pat. No. 3,207,608 indicates that meat can be tenderized by injecting between 15-40 wt. % of a solution containing 2-10 wt. % common salt and 1-4% of a phosphate salt into the meat. The '608 patent indicates that of the phosphates, tripolyphosphates, tri and disodium phosphates produce the best results.

U.S. Pat. No. 2,812,261 also uses sodium tripolyphosphate but in combination with sodium ascorbate. This combination is said to provide a synergistic effect improving the meat's color and firm appearance.

U.S. Pat. No. 3,118,777 relates to comminuted meat products, such as sausage, and recommends treatment of the meat with 1-15 parts by weight of an alkali metal phosphate and 1 part by weight of an alkali metal trivalent metal phosphate. Apparently, the addition of tetrasodium pyrophosphate and sodium aluminum phosphate to the meat results in a decrease in the weight loss of the comminuted meat product upon cooking. Further, for meats having a high pH, also known as "dark cutters," sodium aluminum phosphate is a recommended additive to adjust pH and improve binding and color.

U.S. Pat. No. 3,401,046 is directed to a composition useful as a substitute for the common curing agent, sodium nitrite which is conventionally added to hams, bacon, sausage and the like. The substitute composition is said to be safer and is a mixture of anhydrous sodium tripolyphosphate and a solution of sodium nitrite in sufficient water to hydrate the sodium tripolyphosphate.

U.S. Pat. No. 3,561,983 indicates that numerous curing compositions have been prepared for use in improving and stabilizing the color and obviating shrinkage of meat products. In practice, the alkali metal phosphates are sodium phosphates having a $Na_2O$ to $P_2O_5$ molar ratio of about 1.7:1. These alkali metal phosphates in a 1% aqueous solution have a pH of about 9.8. When meat is treated with solutions of such phosphates, the pH tends to increase and this inhibits shrinkage of the meat products. When the pH of the meat is increased above the isoelectric point of the meat proteins, the water-binding capacity of the meat is increased. The '983 invention is a particulate composition for use in meat curing. This particulate composition includes an alkali metal hydroxide, such as sodium hydroxide, and a substantially non-reverted alkali metal tripolyphosphate, such as sodium tripolyphosphate, either with or without other meat curing ingredients.

U.S. Pat. No. 3,875,313 also uses sodium tripolyphosphate and is directed to a granular mixture of sodium tripolyphosphate and lemon juice. This granular mixture is said to be effective for treating meats to maintain color, taste and fresh quality even when the meats have been frozen for a long period of time.

U.S. Pat. No. 4,313,963 indicates a method for tenderizing meat by slitting the meat with a plurality of blades and then spraying the slit meat with a tenderizing solution. The sprayed and tenderized meat is then packaged and frozen. The tenderizing solution may contain any of the known tenderizing phosphates such as sodium tripolyphosphate, sodium hexametaphosphate, sodium acid pyrophosphate, tetrasodium pyrophosphate, or combinations thereof.

U.S. Pat. No., 4,500,559 slows the blending of shank meat with autolyzed yeast extract and sodium tripolyphosphate together with lemon juice. This mixture is said to improve the taste of the meat. The yeast extract is said to reduce the "rangy or grassy" flavor of the meat and, in combination with the sodium tripolyphosphate and lemon juice, improves the texture and moisture retention as well as palatability of the meat.

U.S. Pat. No. 4,746,522 provides a composition for reducing the weight loss of meat upon cooking. This composition includes acetic acid, gelatin, starch, sodium chloride, phosphate salt and water. The preferred phosphate salt is sodium tripolyphosphate.

Despite all the above research and development, there yet exists a need for a meat treatment process that will prevent weight loss upon cooking and, indeed, will provide a weight increase. Further, the process should not have a deleterious effect upon the organoleptic properties of the meat but should enhance tenderness, taste and palatability.

SUMMARY OF THE INVENTION

The invention provides a marinate composition for use in the treatment of meat and a process for treating meat with the marinate composition so that when the treated meat product is cooked, the cooked product has a higher weight than the raw meat before processing. Further, the treatment process, which includes tumbling or massaging the meat with the marinate, tenderizes the meat. The marinate composition does not have a deleterious effect on the taste or smell of the meat product but may be used in combination with spices to enhance the taste of the meat product.

The process is especially useful for the processing of "fajitas," a Southwestern delicacy comprising marinated strips of meat, typically skirt steaks, which is usually cooked by grilling, often over a mesquite-wood fire, and is served sizzling with grilled sliced onions. Fajitas may also be prepared from other meats, such as chicken, pork and the like, cut into strips.

DETAILED DESCRIPTION OF THE PREFERRED EMBODIMENTS

The present invention provides a marinate composition which penetrates the meat during processing to cause the weight of the meat product to be higher than that of the original raw meat. Once cooked, the weight of the cooked product is also higher than that of the raw, untreated meat. Thus, the treatment of meat with the invention process and composition results in an overall weight gain.

The treatment process and composition is not restricted to any one type of meat but may be used to treat beef, pork, lamb and poultry, either in whole or comminuted form. Whole forms of meats include roasts, briskets, etc.

The marinate composition of the invention includes water, soya protein, sodium tripolyphosphate, and optionally, spices and condiments to taste. The marinate composition is prepared by mixing and dissolving soya protein in water and adding a solution of sodium tripolyphosphate to the soya protein solution. The order of addition of soya protein and sodium tripolyphosphate to the water is not important and may be reversed or carried out simultaneously. Spices, condiments and the like may be added to the marinate solution or to the meat.

The meat to be treated is then infused with the marinating solution. Preferably, the meat is processed with the marinate solution in a device that provides a tumbling or massaging action. However, the marinate can also be pumped or infused into the meat by other means known to those of skill in the art. It is further preferred that the tumbling or massaging process be carried out at reduced pressure, preferably under a vacuum. The processing time will vary depending upon the type of meat being prepared, however, typically the processing time varies from about 10 minutes to about 4 hours depending upon the meat type and size of the discrete pieces of meat. The meat product is then withdrawn from the tumbling or massaging device for packaging.

Generally, the weight of the cooked meat product, whether cooked by roasting, grilling (rare or well done) or barbecuing, will exceed the initial raw weight of the meat by about 5 wt. % to about 10 wt. % based upon the raw meat weight. This phenomenon has not heretofore been observed in a meat treating process. Further, the meat tenderness and organoleptic properties are enhanced by the process, the marinate and the spices.

A preferred method for preparing the invention marinate composition, is to slowly add isolated soya protein to water while mixing to dissolve the protein, to produce a soya protein concentrate of from about 2 to about 9 wt. %, preferably about 7.5 wt. % soya protein. To this protein concentrate is added about 0.5-2 wt. % sodium tripolyphosphate. For ease of mixing, the sodium tripolyphosphate should preferably be in a separate premixed solution. This premixed solution may have a concentration of about 10 wt. % sodium tripolyphosphate.

The marinate composition is then poured into a meat processing device which has a tumbling and/or massaging action. The meat is preferably added to the marinate composition in the approximate meat:marinate mass ratio of from about 75:45 to about 135:45, most preferably about 100:45. The tumbling or massaging process is then commenced under a vacuum of about 22-24 inches of mercury. This vacuum process is then allowed to continue for from about 10 minutes to about 4 hours depending upon the meat size, type and quality (toughness and ability to absorb marinate). Thus, chicken breasts may be tumbled for about 10-25 minutes while top round beef may require up to about 4 hours. Once the process is complete, as evidenced by absorption of substantially all the marinate into the meat, the meat may be withdrawn, packaged and refrigerated for sale.

The processing device that provides the tumbling or massaging action may be selected from commercially available meat processing equipment.

The following experiments serve to illustrate the invention and are not intended to limit the scope of the invention as described above and claimed hereafter.

Examples

Tests were conducted to determine the quality and weight gain of four samples of meat treated with the invention marinate composition and the invention process. The meats included 25 pound samples of 1) strips of beef skirt steak (fajitas); 2) boneless, skinless, chicken thigh meat; and 3) raw, boneless, skinned chicken breast.

For each of the three meat types, 0.75 pounds of isolated soya protein was slowly added to 8.5 pounds of tap water while mixing rapidly to dissolve the protein. Separately, 0.125 pounds of sodium tripolyphosphate was dissolved in 1.25 pounds of water. The sodium tripolyphosphate solution was then mixed with the soya protein solution. The combined solution was poured into a meat tumbler and 0.375 pounds of spices and condiments were added. The meat was then added to the marinate solution, a vacuum of about 22-24 inches of mercury was drawn on the tumbler, and the meat and marinate was tumbled for about 10-25 minutes for the chicken and about 1 hour for the beef sample to absorb the marinate into the meat.

Comparison tests were carried out with 25 pound batches of the same meat types wherein (i) the meat was untreated with any marinate; and (ii) the meats were treated with a conventional marinate not including isolated soya protein. The invention products were also compared to a commercially available marinated meat. The results are shown in Table I.

From Table I, it is apparent that samples 1, 2 and 3 using the invention marinate and process provide superior weight retention and, indeed, show a weight gain over the raw meat. The unmarinated meat samples, samples 4-6 show a weight loss upon cooking. Samples 7 and 8 were treated with a conventional Italian dressing and show a weight loss upon cooking. Commercially available sample 4 shows a large weight loss.

TABLE I

| | Meat Sample | Raw | After Marinating | After Grilling |
|---|---|---|---|---|
| 1 | Beef skirt steak | 25 | 33.75 | 27.2 |
| 2 | Chicken thighs | 25 | 33.51 | 26.9 |
| 3 | Chicken breasts | 25 | 33.25 | 26.3 |
| 4 | Beef skirt steak | 25 | Not Marinated | 16.7 |
| 5 | Chicken thighs | 25 | Not Marinated | 18.6 |
| 6 | Chicken breasts | 25 | Not Marinated | 18.1 |
| 7 | Chicken thigh | 25 | 28.75 | 17.8 |
| 8 | Chicken breasts | 25 | 28.05 | 17.6 |
| 9 | Beef skirt steak | — | 29 | 15.4 |

The invention has been described with reference to its preferred embodiments. A person having ordinary skill in the art may appreciate modifications that can be made to the description that are within the scope and spirit of the invention as claimed below.

What is claimed is:

1. A method of treating uncooked meat, comprising:
   (a) tumbling the meat with a marinate composition comprising from about 0.5 to about 2.0 pounds of sodium tripolyphosphate and from about 3 to about 9 pounds of isolated soya protein per 100 pounds of water; and
   (b) allowing the marinate to tenderize the meat; wherein said tenderized meat, upon cooking, produces a cooked product of higher weight than the uncooked meat.

2. The method of claim 1 wherein said tumbling is carried out at conditions below atmospheric pressure.

3. A method of preparing a meat product produced by marinating uncooked meat, comprising cooking the meat product, the uncooked meat having been mixed with a marinating composition comprising from about 0.5 to about 2.0 pounds of sodium tripolyphosphate and from about 3 to about 9 pounds of isolated soya protein per 100 pounds of water to produce the meat product; and wherein said meat product, after cooking, has a higher weight than the uncooked meat before marination.

* * * * *